May 5, 1925.
E. P. OGDEN
DRIER OR PREHEATER
Filed Nov. 3, 1920
1,536,406
2 Sheets-Sheet 2
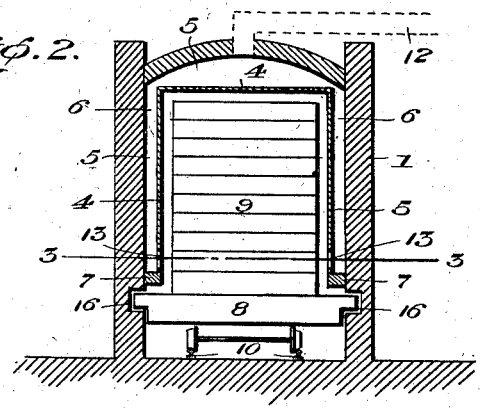
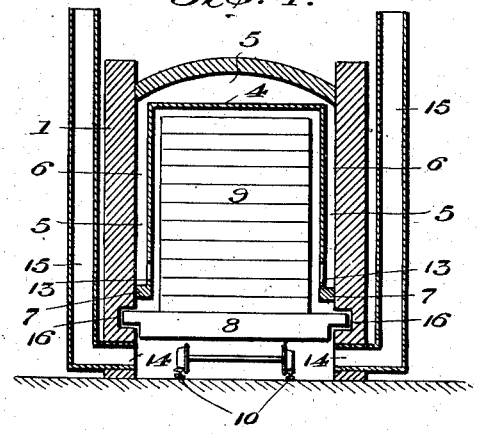

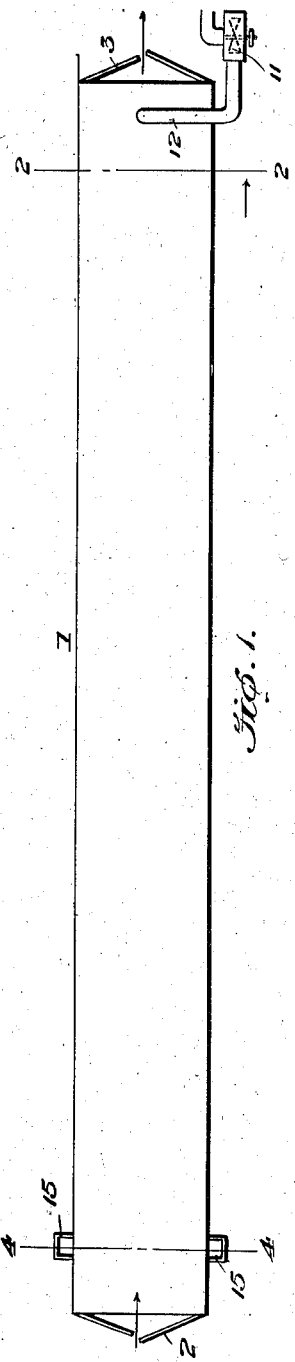
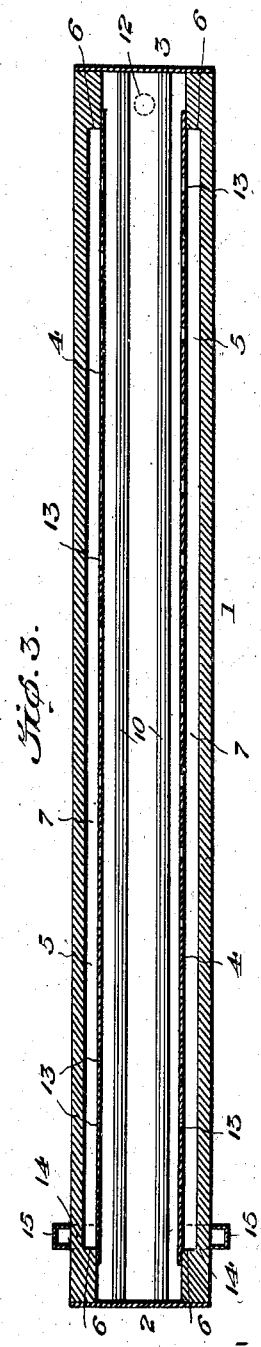

Patented May 5, 1925.

1,536,406

UNITED STATES PATENT OFFICE.

ELLSWORTH P. OGDEN, OF COLUMBUS, OHIO, ASSIGNOR TO JOHN B. OWENS, OF ZANESVILLE, OHIO.

DRIER OR PREHEATER.

Application filed November 3, 1920. Serial No. 421,543.

*To all whom it may concern:*

Be it known that I, ELLSWORTH P. OGDEN, a citizen of the United States, residing at Columbus, in the county of Franklin and State of Ohio, have invented certain new and useful Improvements in Driers or Preheaters, of which the following is a specification.

This invention relates to a drier or preheater, particularly adapted for the utilization of warm air supplied by a fan, preferably a plenum fan, which will be adapted for the drying or preheating of clay wares or the like by radiation and convection, and the method of operation thereof.

The warm air which is utilized, under plenum conditions, in the operation of my drier or preheater may be derived from any suitable source. A new means and method for collecting warm air radiated from a tunnel kiln set forth and claimed in a patent to John B. Owens, No. 1,510,556, dated October 7, 1924, may constitute the source of warm air used by the present drier or preheater, but the invention is not limited to such source of producing warm air.

The object of the present invention is to provide a drier or preheater of improved construction wherein a plenum fan supplies warm air behind metal or other surfaces or plates constituting the sides and top of the drying compartment or chamber, heat being conveyed to the interior of the drying chamber or compartment by convection and radiation.

In carrying out my invention, including the method of operation, the warm air is discharged into a suitable space or spaces between the metal or other plates and the walls of the preheater, heating the metal or other plates throughout the entire length of the drying compartment and by radiation and convection transferring the heat to the compartment to the end that the clay or other wares therein may be dried. Preferably the warm air is admitted behind the aforesaid metal or other plates near the exit end of the compartment. At this point the difference in temperature between the incoming warm air and the ware in the compartment will be at a minimum. The air travels in the space between the metal plates and the walls of the drier from the exit end to the point of take-off or outlet which is preferably provided at the entrance end of the drier or in the region thereof. During this travel, the temperature difference between the ware in the drier and the air blown into the space by the fan is greater, thus producing a greater transfer of heat through the metal or other plates to the interior of the drier. Consequently a cooling of the air is effected which results in a continuing drop in temperature of the metal or other plates as the entrance end of the drier is approached, because the temperature of the air behind the plates has been lowered.

I preferably provide openings in the metal plates located at points near the bottom of the ware or the surface of the tops of the cars which transport the ware through the preheater. These perforations or openings preferably increase in size beginning with those of smallest size located at the entrance end of the preheater and increasing in size in successive openings toward the exit of the preheater.

By reason of the travel of the warm air introduced under plenum condition into the space or spaces between the metal plates and the walls and crown of the drier and its travel through the openings, the ware entering the drier is gradually heated by radiation and convection, supplemented by direct blast of the warm air, as it travels through the drier, until on its approach to the exit end of the drier it is subject to maximum temperature obtained by radiation and convection and a vigorous blast of air directed through the largest openings in the metal or other plates.

The outlets hereinbefore referred to communicate with the bottom of the drier and with any suitable take-off and they may be provided with suitable damper control, if desired. These outlets provide an exit for the moisture laden or spent air.

Suitable doors may be provided for the ends of the drier or preheater.

While I have disclosed in the accompanying drawings, and hereinafter describe, certain embodiments of my invention, this is done by way of illustration and not for the purpose of limiting the scope of the invention to these particular embodiments as I am well aware that my improved means and method may be carried out in other forms without departing from the essential principles thereof.

In the accompanying drawings:

Figure 1 is a plan view;

Fig. 2, a vertical section on the line 2—2, Fig. 1;

Fig. 3, a horizontal section on the line 3—3, Fig. 2;

Fig. 4, a vertical section on the line 4—4, Fig. 1.

The drier may be of any desired length but will probably be most efficient when built in a length of fifty to one hundred feet. The drier is shown generally at 1 and is provided at its ends with suitable doors, shown at the entrance end at 2 and the exit end at 3. The drier is preferably built of bricks.

A sheet metal or other heat-conducting lining 4 is provided which is separated from the sides and the crown of the drier by a heating space or spaces 5 extending nearly the full length of the drier 1 and is supported in any suitable manner. The ends of the heat compartment 5 are closed as at 6 and the compartment 5 is also closed or sealed at the bottom as at 7.

One of the cars which carry the ware to be preheated is shown at 8, the ware appearing at 9. The car runs on rails 10. The ware is supported inside of the elongated box-like shell composed of the sheet metal walls and top 4 and consequently the ware 9 is positioned to be dried or preheated by radiation and convection from said walls 4.

Warm or hot air is supplied to the spaces 5 by a plenum fan or blower 11 which forces the air through a pipe 12 that communicates with the space 5 in the region of the exit end of the drier.

The warm air delivered to the blower or fan 11 may be obtained by means such as set forth in a patent to John B. Owens, No. 1,510,556, dated October 7, 1924, but it may come from any source.

The plates or lining 4 have openings 13 which are located in line with the lower portions of the ware 9 or near the surfaces of the car tops 8 so that there will be a direct discharge or blast of the warm air from the chamber 5 directly onto the ware 9. The openings 13 increase in size beginning with those at the entrance end of the drier until they are of much larger size near the exit end thereof.

The plenum fan 11 supplies warm air which fills the space 5 and the heat therefrom is conveyed by radiation and convection from the lining 4 to the ware 9. The warm air also discharges in blasts through the openings 13 directly onto the ware. The air is admitted at its greatest temperature near the exit end of the drier and hence the temperature difference between the air where it enters the space 5 and the temperature of the ware about to emerge from the drier is at a minimum. In brief, the exit end of the drier is the hottest part thereof. As the air travels in the space 5 toward the entrance end of the drier the temperature of the air drops and consequently the ware is gradually warmed up as it enters the drier until it finally reaches its greatest temperature when it is opposite the point where the fan 11 blows the air into the space 5. To cause the gradual warming up of the ware, the openings 13 are smallest at the entrance end and increase in size toward the exit end of the drier.

For the purpose of taking off the moisture-laden or spent air, outlets 14 are provided through the walls of the drier 1, said outlets communicating with the space below the car platforms 8 and communicating with pipes or stacks 15. The car platforms 8 project into channels 16 affording communication between the interior of the drier and the space below the cars.

It will be understood that the preferable mode of operation includes a supply of warm air under plenum condition to the interior of the drier but the invention is not limited to a plenum supply of warm air or the maintenance of a plenum condition of warm air supply.

What I claim is:

1. A drier or preheater of the tunnel type wherein the ware enters one end thereof and, after progressing therethrough, emerges from the other end thereof, having interior metal or other heat-conducting walls and a chamber or space back of said walls, and means for delivering heated air to said space for the purpose of heating said walls.

2. A drier or preheater having interior metal or other heat-conducting walls provided with openings and a chamber or space back of said walls, and means for delivering heated air to said space for the purpose of heating said walls and the discharge of said heated air into the interior of the drier.

3. A tunnel drier or preheater having an entrance end and an exit end and provided with interior walls and a chamber or space back of said walls, and means for delivering heated air to said space in the region of the exit end of the drier for the purpose of heating said walls with maximum temperature effect in the region of the exit end of the drier and with gradually diminishing temperature therefrom toward the entrance end of the drier.

4. A tunnel drier or preheater having an entrance end and an exit end and provided with interior walls provided with openings which are largest in the region of the exit end of the drier and decrease in size therefrom toward the entrance end of the drier, and a chamber or space back of said walls, and means for delivering heated air to said space in the region of the exit end of the drier for the purpose of heating said walls and discharging heated air into the interior of the drier with maximum temperature effect in the region of the exit end of the drier and with gradually diminishing temperature therefrom toward the entrance end of the drier.

5. A tunnel drier or preheater having an entrance end and an exit end and provided with interior walls and a chamber or space back of said walls, means for delivering heated air to said space for the purpose of heating said walls, and means for voiding or taking off the moisture-laden or spent air from the interior of the drier.

6. The method of operating a tunnel type of drier or preheater wherein the ware enters one end thereof and, after progressing therethrough, emerges from the other end thereof, consisting in supplying a heating medium at a maximum temperature to the interior of the drier in the region of the exit end thereof and to the interior of the tunnel at gradually decreasing temperatures from said region toward the region of the entrance end of the drier.

7. The method of operating a tunnel type of drier or preheater wherein the ware enters one end thereof and, after progressing therethrough, emerges from the other end thereof, consisting in supplying a heating medium by radiation, convection, and direct blast at maximum temperature to the interior of the drier in the region of the exit end thereof and to the interior of the tunnel at gradually decreasing temperatures from said region toward the region of the entrance end of the drier.

In testimony whereof I affix my signature.

ELLSWORTH P. OGDEN.